United States Patent
Wu

(10) Patent No.: US 10,624,151 B2
(45) Date of Patent: Apr. 14, 2020

(54) DEVICE AND METHOD OF HANDLING A SIGNALLING RADIO BEARER CONFIGURATION

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/221,624

(22) Filed: Dec. 17, 2018

(65) Prior Publication Data

US 2019/0191481 A1 Jun. 20, 2019

Related U.S. Application Data

(60) Provisional application No. 62/599,781, filed on Dec. 17, 2017.

(51) Int. Cl.
| | |
|---|---|
| *H04W 76/27* | (2018.01) |
| *H04W 36/00* | (2009.01) |
| *H04W 76/15* | (2018.01) |
| *H04W 76/22* | (2018.01) |
| *H04L 29/08* | (2006.01) |
| *H04W 80/08* | (2009.01) |

(52) U.S. Cl.
CPC ........... *H04W 76/27* (2018.02); *H04L 69/322* (2013.01); *H04W 36/0027* (2013.01); *H04W 36/03* (2018.08); *H04W 76/15* (2018.02); *H04W 76/22* (2018.02); *H04W 80/08* (2013.01)

(58) Field of Classification Search
CPC ...... H04L 69/04; H04W 28/06; H04W 72/04; H04W 72/0406
See application file for complete search history.

(56) References Cited

U.S. PATENT DOCUMENTS 10,349,463 B2 * 7/2019 Pelletier ................ H04W 16/32

OTHER PUBLICATIONS

Search Report dated May 16, 2019 for EP application No. 18213097. 1, pp. 1-5.

(Continued)

*Primary Examiner* — Chandrahas B Patel
(74) *Attorney, Agent, or Firm* — Winston Hsu

(57) ABSTRACT

A communication device for handling a signalling radio bearer (SRB) configuration comprises instructions of: communicating with a first base station (BS) according to a first SRB configuration, wherein the first SRB configuration configures a first SRB; configuring a first packet data convergence protocol (PDCP) entity associated to the first SRB according to a first PDCP; receiving a first radio resource control (RRC) connection reconfiguration message on the first SRB according to the first PDCP from the first BS or a second BS; releasing the first PDCP entity associated to the first SRB and configuring a second PDCP entity to apply a second PDCP according to a second SRB configuration, when the first RRC connection reconfiguration message comprises the second SRB configuration; and transmitting a first RRC connection reconfiguration complete message according to the second PDCP entity on the first SRB to a third BS.

13 Claims, 6 Drawing Sheets

(56) References Cited

OTHER PUBLICATIONS

3GPP TS 36.323 V14.4.0 (Sep. 2017), "3rd Generation Partnership Project; Technical Specification Group Radio Access Network; Evolved Universal Terrestrial Radio Access (E-UTRA); Packet Data Convergence Protocol (PDCP) specification (Release 14)", XP051337315, pp. 1-43.
3GPP TS 38.331 V1.0.0 (Dec. 2017), "3rd Generation Partnership Project; Technical Specification Group Radio Access Network; NR; Radio Resource Control (RRC); Protocol specification (Release 15)", XP051450280, pp. 1-187.
3GPP TS 38.323 V2.0.0 (Dec. 2017), "3rd Generation Partnership Project; Technical Specification Group Radio Access Network; NR; Packet Data Convergence Protocol (PDCP) specification (Release 15)", XP051450276, pp. 1-26.
3GPP TS 36.331 V14.3.0 (Jun. 2017), "3rd Generation Partnership Project; Technical Specification Group Radio Access Network; Evolved Universal Terrestrial Radio Access (E-UTRA); Radio Resource Control (RRC); Protocol specification (Release 14)", XP055572235, pp. 1-745.
3GPP TS 36.331 V14.4.0 (Sep. 2017) Technical Specification 3rd Generation Partnership Project; Technical Specification Group Radio Access Network; Evolved Universal Terrestrial Radio Access (E-UTRA); Radio Resource Control (RRC); Protocol specification (Release 14).

* cited by examiner

DEVICE AND METHOD OF HANDLING A SIGNALLING RADIO BEARER CONFIGURATION

CROSS REFERENCE TO RELATED APPLICATIONS

This application claims the benefit of U.S. Provisional Application No. 62/599,781 filed on Dec. 17, 2017, which is incorporated herein by reference.

BACKGROUND OF THE INVENTION

1. Field of the Invention

The present invention relates to a device and a method used in a wireless communication system, and more particularly, to a device and a method of handling a signalling radio bearer configuration.

2. Description of the Prior Art

A new radio (NR) system, initiated by the third generation partnership project (3GPP), includes a new radio interface and a new radio network architecture that provides a high data rate, a low latency, packet optimization, and an improved system capacity and an improved coverage.

SUMMARY OF THE INVENTION

The present invention therefore provides a method and related communication device for handling a signalling radio bearer configuration to solve the abovementioned problem.

A communication device for handling a signalling radio bearer (SRB) configuration comprises at least one storage device; and at least one processing circuit coupled to the at least one storage device. The at least one storage device stores, and the at least one processing circuit is configured to execute instructions of: communicating with a first base station (BS) according to a first SRB configuration, wherein the first SRB configuration configures a first SRB; configuring a first packet data convergence protocol (PDCP) entity associated to the first SRB according to a first PDCP; receiving a first radio resource control (RRC) connection reconfiguration message on the first SRB according to the first PDCP from the first BS or a second BS; releasing the first PDCP entity associated to the first SRB and configuring a second PDCP entity to apply a second PDCP according to a second SRB configuration, when the first RRC connection reconfiguration message comprises the second SRB configuration; and transmitting a first RRC connection reconfiguration complete message according to the second PDCP entity on the first SRB to a third BS, in response to the first RRC connection reconfiguration message.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
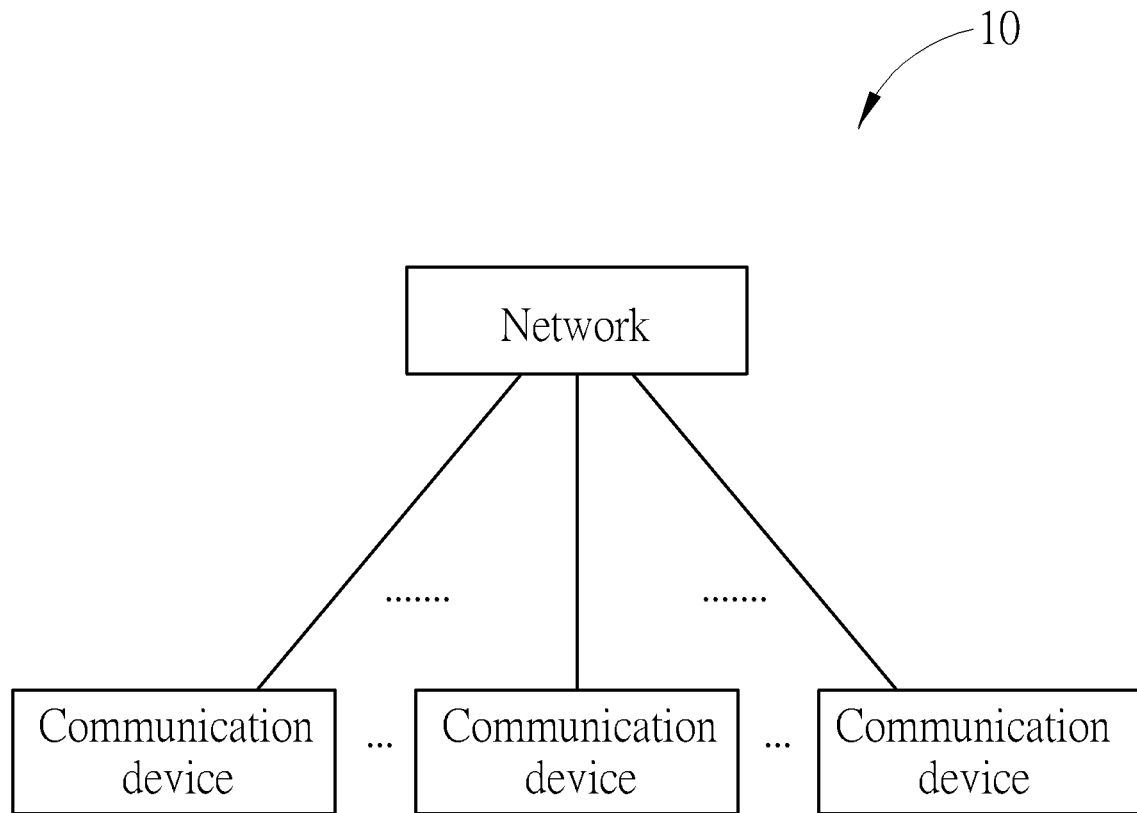
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers in the same or different duplexing modes (e.g., frequency-division duplexing (FDD), time-division duplexing (TDD) or flexible duplexing).

In FIG. 1, the network and the communication devices are simply utilized for illustrating a structure of the wireless communication system 10. The network may be an evolved Universal Terrestrial Radio Access Network (E-UTRAN) including at least one evolved Node-B (eNB) which may connect to an evolved packet core (EPC) and/or a fifth generation core (5GC).

A communication device may be a UE, a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
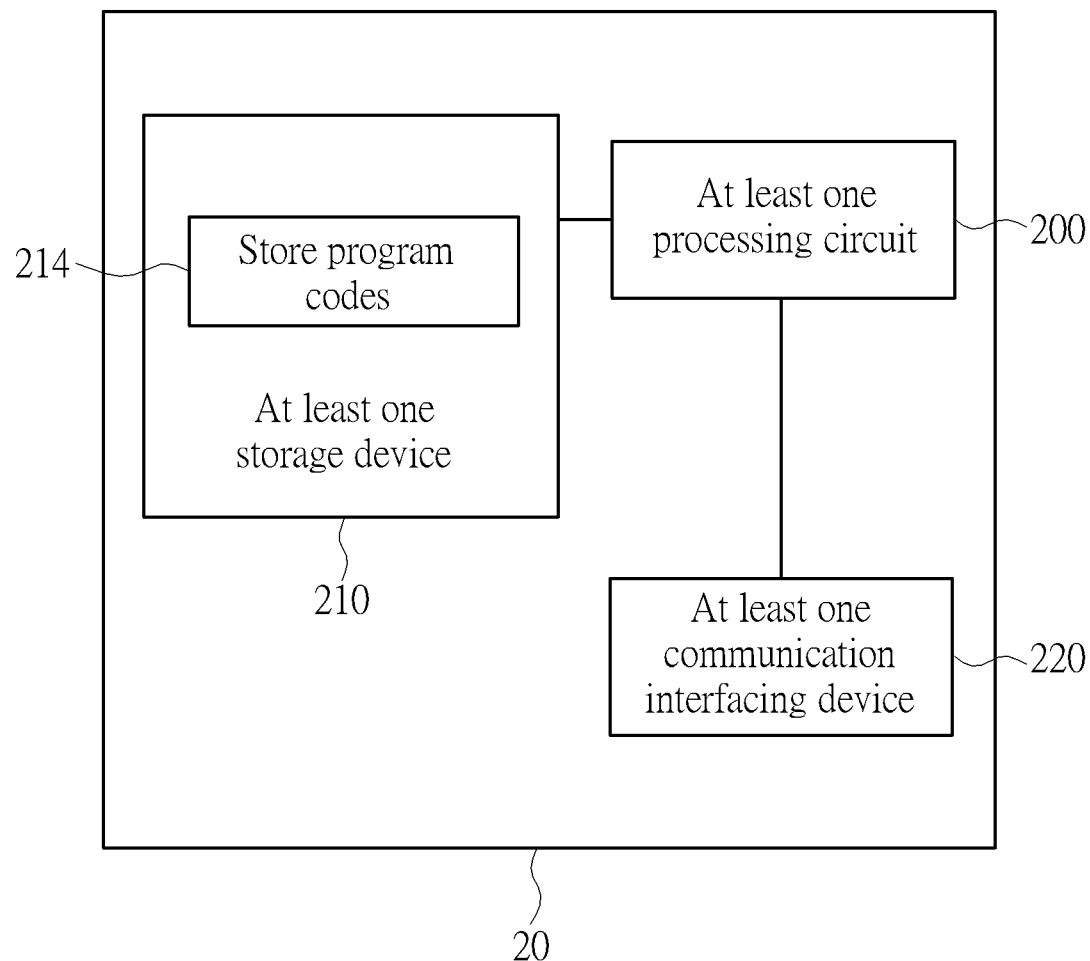
FIG. 2 is a schematic diagram of a communication device according to an example of the present invention.

FIG. 2 is a schematic diagram of a communication device 20 according to an example of the present invention. In FIG. 2, the communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 includes at least one transceiver and is used to transmit and receive signals (e.g., data, messages and/or packets) according to processing results of the at least one processing circuit 200.

In the following examples, a UE is used to represent a communication device in FIG. 1, to simplify the illustration of the embodiments.

Figure 3:
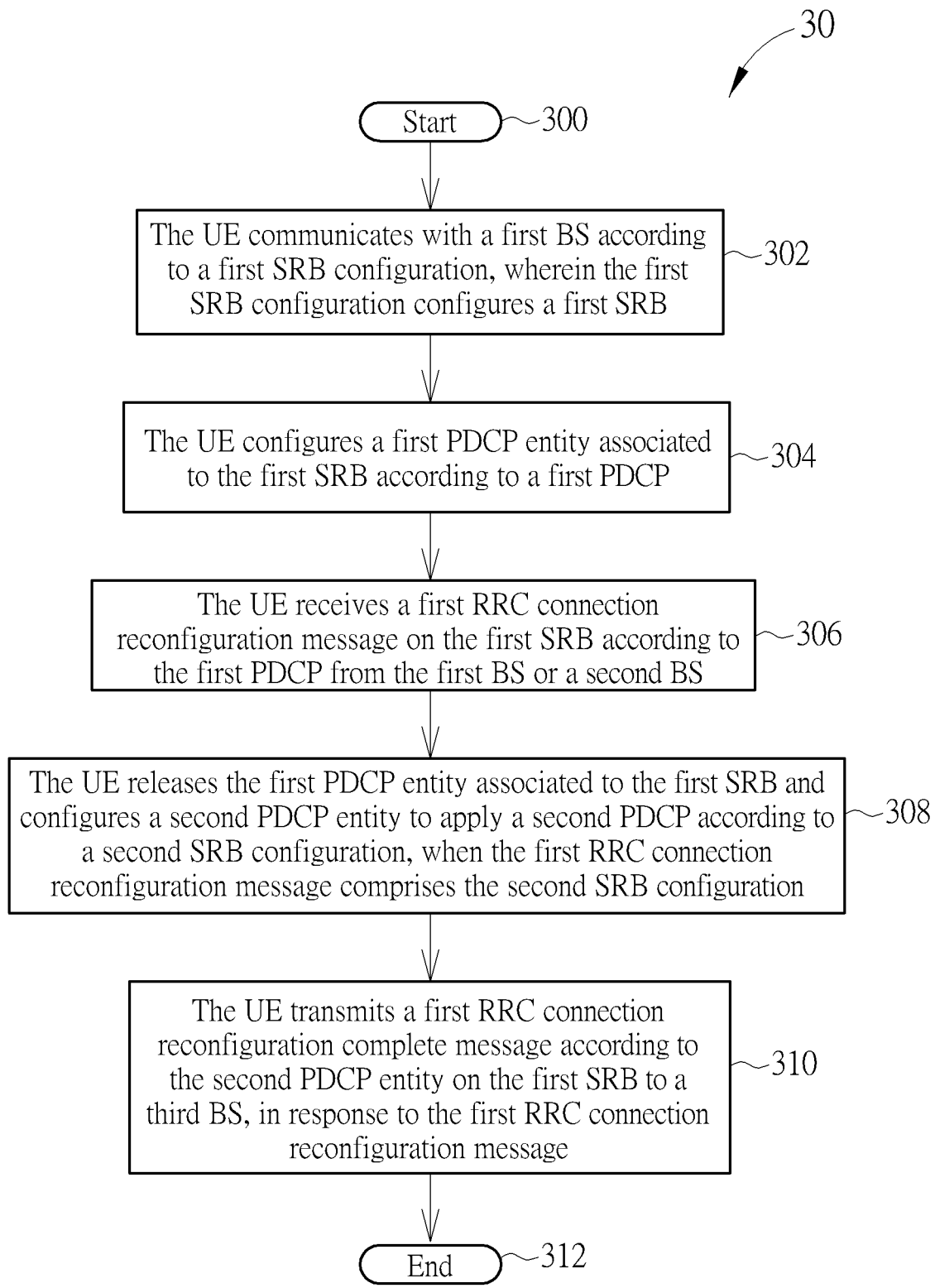
FIG. 3 is a flowchart of a process according to an example of the present invention.

A process 30 in FIG. 3 is utilized in a UE (e.g., the communication device in FIG. 1), and includes the following steps:

Step 300: Start.

Step 302: The UE communicates with a first base station (BS) according to a first signalling radio bearer (SRB) configuration, wherein the first SRB configuration configures a first SRB.

Step 304: The UE configures a first packet data convergence protocol (PDCP) entity associated to the first SRB according to a first PDCP.

Step 306: The UE receives a first radio resource control (RRC) connection reconfiguration message on the first SRB according to (e.g., by using) the first PDCP from the first BS or a second BS.

Step 308: The UE releases the first PDCP entity associated to the first SRB and configures a second PDCP entity to apply a second PDCP according to a second SRB configuration, when the first RRC connection reconfiguration message comprises the second SRB configuration.

Step 310: The UE transmits a first RRC connection reconfiguration complete message according to (e.g., by using) the second PDCP entity on the first SRB to a third BS, in response to the first RRC connection reconfiguration message.

Step 312: End.

In one example, the first RRC connection reconfiguration message neither includes a SRB release indication (e.g., srb-ToRelease or srb-ToReleaseList) indicating to release the first SRB, nor includes a PDCP release indication (e.g., pdcpRelease) indicating to release the first PDCP entity. Thus, the UE releases the first PDCP entity associated to the first SRB in response to the second SRB configuration.

In one example, when the UE configures (or establishes) the second PDCP entity, the UE initializes a set of variables with default or predetermined values of the second PDCP for the second PDCP entity. Thus, the UE operates (e.g., runs or executes) the second PDCP according to (e.g., by using) the second PDCP entity. When the UE releases the first PDCP entity, the UE stops operating the first PDCP for the first SRB.

Figure 4:
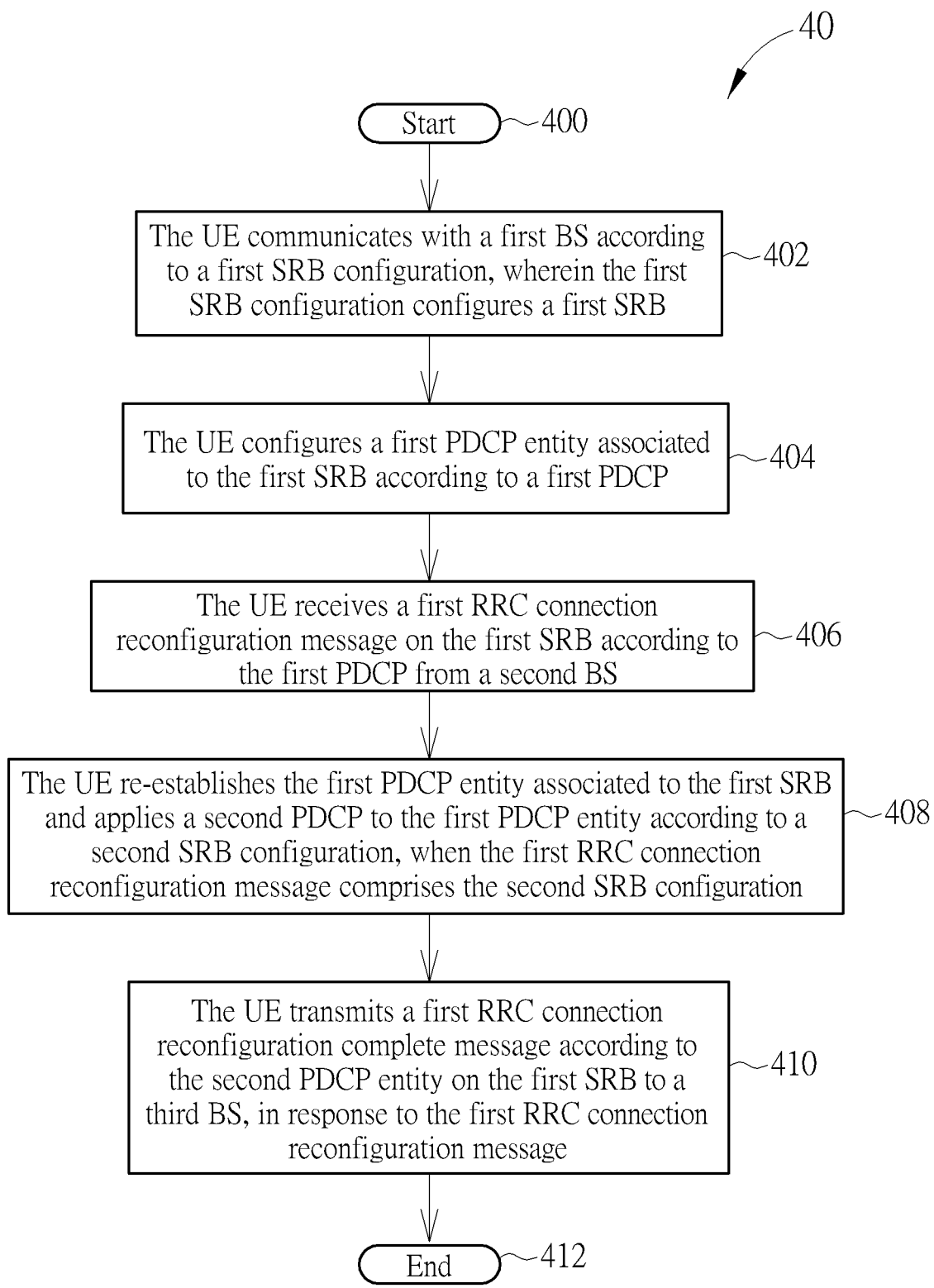
FIG. 4 is an example of a mapping table according to an example of the present invention.

A process 40 in FIG. 4 is utilized in a UE (e.g., the communication device in FIG. 1), and includes the following steps:

Step 400: Start.

Step 402: The UE communicates with a first BS according to a first SRB configuration, wherein the first SRB configuration configures a first SRB.

Step 404: The UE configures a first PDCP entity associated to the first SRB according to a first PDCP.

Step 406: The UE receives a first RRC connection reconfiguration message on the first SRB according to (e.g., by using) the first PDCP from a second BS.

Step 408: The UE re-establishes the first PDCP entity associated to the first SRB and applies a second PDCP to the first PDCP entity according to a second SRB configuration, when the first RRC connection reconfiguration message comprises the second SRB configuration.

Step 410: The UE transmits a first RRC connection reconfiguration complete message according to (e.g., by using) the second PDCP entity on the first SRB to a third BS, in response to the first RRC connection reconfiguration message.

Step 412: End.

In one example, the first RRC connection reconfiguration message does not include a SRB release indication (e.g., srb-ToRelease or srb-ToReleaseList) to release the first SRB. In one example, the first RRC connection reconfiguration message does not include a reestablishment indicator indicating the UE to re-establish the first PDCP entity. Thus, the UE re-establishes the first PDCP entity in response to the second SRB configuration. In another example, the second SRB configuration includes the reestablishment indicator indicating the UE to re-establish the first PDCP entity. Thus, the UE re-establishes the first PDCP entity in response to the reestablishment indicator.

In one example, when the UE re-establishes the first PDCP entity and applies the second PDCP to the first PDCP entity, the UE initializes a set of variables with default or predetermined values of the second PDCP for the first PDCP entity. Thus, the UE operates (i.e. run or execute) the second PDCP according to (e.g., by using) the first PDCP entity for the first SRB.

The following may be applied to the processes 30-40.

In one example, when the first RRC connection reconfiguration message includes a third SRB configuration (different from the second SRB configuration) instead of the second SRB configuration, the UE does not release the first PDCP entity and transmits a second RRC connection reconfiguration complete message according to (e.g., by using) the first PDCP entity on the first SRB according to the third SRB configuration. The third SRB configuration may be same as or different from the first SRB configuration.

In one example, when the first RRC connection reconfiguration message includes neither the second SRB configuration nor the third SRB configuration (i.e., does not include a SRB configuration including a SRB identity of the first SRB), the UE does not release the first PDCP entity and transmits a first RRC connection reconfiguration complete message according to (e.g., by using) the first PDCP entity on the first SRB according to the first SRB configuration.

In one example, the first RRC connection reconfiguration message includes both the second SRB configuration and the third SRB configuration. In this case, the UE still applies Steps 308 and 408 respectively in the processes 30 and 40. In addition, the UE may (re)configure a radio link control (RLC) entity associated to the first SRB according to the third SRB configuration, or may (re) configure a logical channel associated to the first SRB according to the third SRB configuration.

In one example, the first SRB configuration includes a first SRB identity identifying the first SRB, and does not include a PDCP configuration. That is, the UE may use a first PDCP configuration which is predetermined, preconfigured or specified by a standard specification, for the first PDCP entity. The second SRB configuration may include a PDCP configuration configuring the second PDCP. The third SRB configuration may not include a PDCP configuration.

In one example, the second SRB configuration and the third SRB configuration includes the first SRB identity. Thus, the UE may identify that the second SRB configuration is applied to the first SRB according to the first SRB identity, and identify that the third SRB configuration is applied to the first SRB according to the first SRB identity.

In one example, the first PDCP is a long-term evolution (LTE) PDCP defined in a first 3GPP technical specification (TS) (e.g., TS 36.323) in a version before, equal to or after v14.4.0, and the second PDCP is a new radio (NR) PDCP defined in a second 3GPP TS (e.g., TS 38.323) in a version equal to or latter than v2.0.0. Variables of the second PDCP may be defined in the 3GPP TS 38.323 v2.0.0 or later version, and are not repeated herein.

In one example, the first SRB configuration is a SRB-ToAddMod defined in a first 3GPP TS (e.g., TS 36.331) before, equal to or after v14.4.0, and the second SRB configuration is a SRB-ToAddMod defined in a second 3GPP TS (e.g., 38.331) equal to or after v1.0.0. The third SRB configuration may be a SRB-ToAddMod defined in a third 3GPP TS (e.g., TS 36.331) before, equal to or after v14.4.0.

Figure 5:
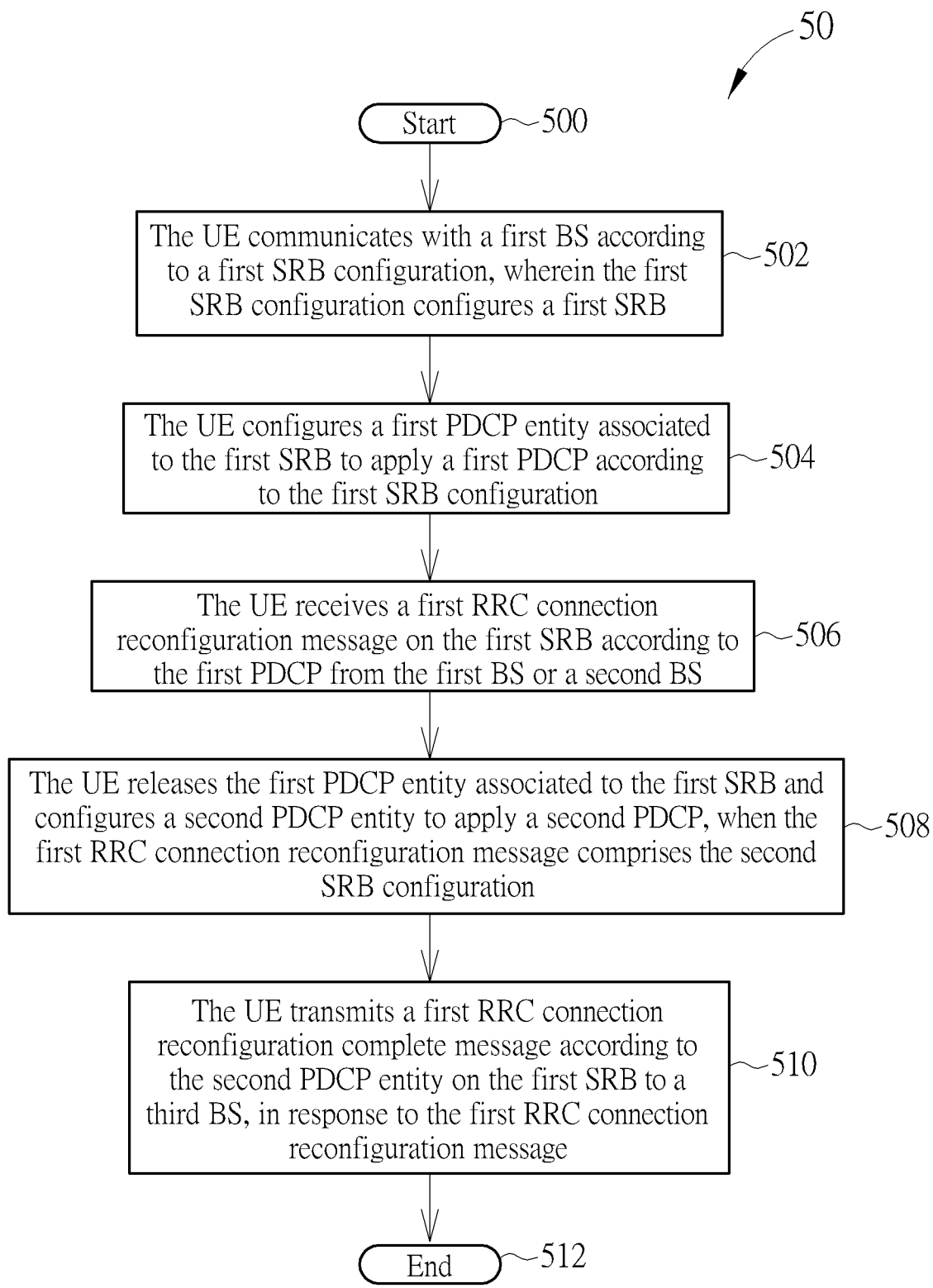
FIG. 5 is a flowchart of a process according to an example of the present invention.

A process 50 in FIG. 5 is utilized in a UE (e.g., the communication device in FIG. 1), and includes the following steps:

Step 500: Start.

Step 502: The UE communicates with a first BS according to a first SRB configuration, wherein the first SRB configuration configures a first SRB.

Step 504: The UE configures a first PDCP entity associated to the first SRB to apply a first PDCP according to the first SRB configuration.

Step 506: The UE receives a first RRC connection reconfiguration message on the first SRB according to (e.g., by using) the first PDCP from the first BS or a second BS.

Step 508: The UE releases the first PDCP entity associated to the first SRB and configures a second PDCP entity to apply a second PDCP, when the first RRC connection reconfiguration message comprises the second SRB configuration.

Step 510: The UE transmits a first RRC connection reconfiguration complete message according to (e.g., by using) the second PDCP entity on the first SRB to a third BS, in response to the first RRC connection reconfiguration message.

Step 512: End.

In one example, the first RRC connection reconfiguration message does not include a SRB release indication (e.g., srb-ToRelease or srb-ToReleaseList) to release the first SRB. Thus, the UE releases the first PDCP entity associated to the first SRB in response to the second SRB configuration. In one example, the first RRC connection reconfiguration message includes a SRB release indication (e.g., srb-ToRelease or srb-ToReleaseList) to release the first SRB. Thus, the UE releases the first PDCP entity associated to the first SRB in response to the SRB release indication. The UE may configure the first SRB according to the second SRB configuration.

In one example, the first RRC connection reconfiguration message does not include a PDCP release indication (e.g., pdcpRelease) to release the first PDCP entity. Thus, the UE releases the first PDCP entity associated to the first SRB in response to the second SRB configuration. In another example, the first RRC connection reconfiguration message includes the PDCP release indication to release the first PDCP entity. Thus, the UE releases the first PDCP entity associated to the first SRB in response to the PDCP release indication.

In one example, when the UE configures (or establishes) the second PDCP entity to apply the second PDCP, the UE initializes a set of variables with default or predetermined values of the second PDCP for the second PDCP entity. Thus, the UE operates (e.g., runs or executes) the second PDCP according to (e.g., by using) the second PDCP entity. When the UE releases the first PDCP entity, the UE stops operating the first PDCP for the first SRB.

Figure 6:
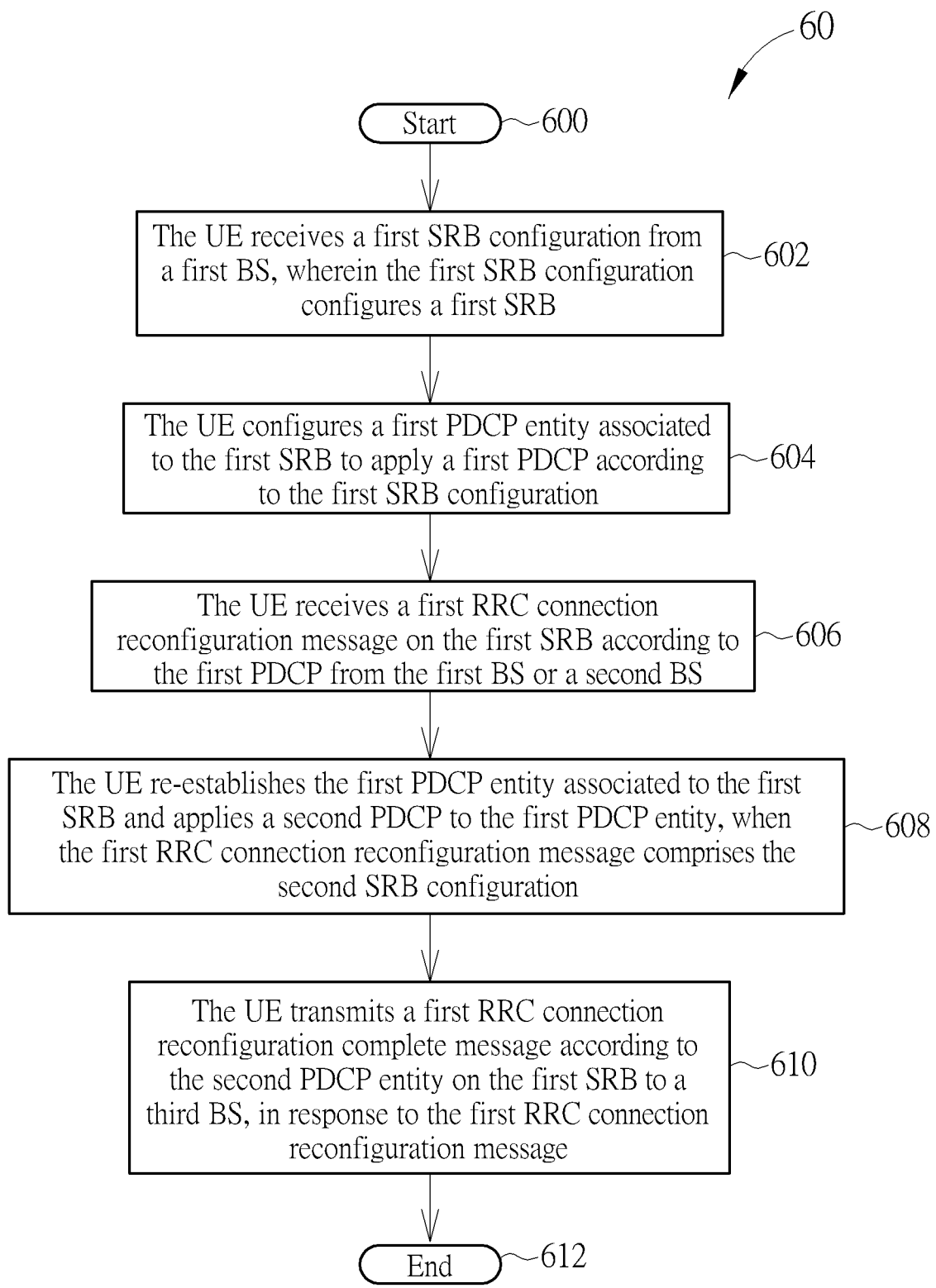
FIG. 6 is an example of a mapping table according to an example of the present invention.

A process 60 in FIG. 6 is utilized in a UE (e.g., the communication device in FIG. 1), and includes the following steps:

Step 600: Start.

Step 602: The UE receives a first SRB configuration from a first BS, wherein the first SRB configuration configures a first SRB.

Step 604: The UE configures a first PDCP entity associated to the first SRB to apply a first PDCP according to the first SRB configuration.

Step 606: The UE receives a first RRC connection reconfiguration message on the first SRB according to (e.g., by using) the first PDCP from the first BS or a second BS.

Step 608: The UE re-establishes the first PDCP entity associated to the first SRB and applies a second PDCP to the first PDCP entity, when the first RRC connection reconfiguration message comprises the second SRB configuration.

Step 610: The UE transmits a first RRC connection reconfiguration complete message according to (e.g., by using) the second PDCP entity on the first SRB to a third BS, in response to the first RRC connection reconfiguration message.

Step 612: End.

In one example, the first RRC connection reconfiguration message may or may not include a SRB release indication (e.g., srb-ToRelease or srb-ToReleaseList) to release the first SRB. In one example, the first RRC connection reconfiguration message does not include a reestablishment indicator indicating the UE to re-establish the first PDCP entity. Thus, the UE re-establishes the first PDCP entity in response to the second SRB configuration. In another example, the second SRB configuration includes the reestablishment indicator indicating the UE to re-establish the first PDCP entity. Thus, the UE re-establishes the first PDCP entity in response to the reestablishment indicator.

In one example, when the UE re-establishes the first PDCP entity and applies the second PDCP to the first PDCP entity, the UE initializes a set of variables with default or predetermined values of the second PDCP for the first PDCP entity. Thus, the UE operates (e.g., runs or executes) the second PDCP according to (e.g., by using) the first PDCP entity for the first SRB.

The following may be applied to the processes 50-60.

In one example, when the first RRC connection reconfiguration message includes the third SRB configuration (different from the second SRB configuration) instead of the second SRB configuration, the UE does not release the first PDCP entity and transmits a first RRC connection reconfiguration complete message according to (e.g., by using) the first PDCP entity on the first SRB according to the third SRB configuration. The third SRB configuration may be the same as or different from the first SRB configuration.

In one example, when the first RRC connection reconfiguration message includes neither the second SRB configuration nor the third SRB configuration (i.e., does not include a SRB configuration including at SRB identity of the first SRB), the UE does not release the first PDCP entity and transmits a first RRC connection reconfiguration complete message according to (e.g., by using) the first PDCP entity on the first SRB according to the first SRB configuration.

In one example, the first RRC connection reconfiguration message may include both the second SRB configuration and the third SRB configuration. In this case, the UE does not apply Steps 508 and 608. In one example, the UE does not release the first PDCP entity and transmits a first RRC connection reconfiguration complete message according to (e.g., by using) the first PDCP entity on the first SRB according to the third SRB configuration, instead of Step 508. In one example, the UE may or may not re-establish the first PDCP entity and may transmit a first RRC connection reconfiguration complete message according to (e.g., by using) the first PDCP entity on the first SRB according to the third SRB configuration, instead of Step 608. In addition, the UE may (re)configure a RLC entity associated to the first SRB according to the second SRB configuration, or may (re)configure a logical channel associated to the first SRB according to the second SRB configuration.

In one example, the first SRB configuration includes a first SRB identity identifying the first SRB, and includes a PDCP configuration. That is, the UE may use the PDCP configuration for the first PDCP entity. The second SRB configuration may not include a PDCP configuration configuring the second PDCP. The UE may use a first PDCP configuration which is predetermined, preconfigured or specified by a standard specification, for the second PDCP entity in Step 508 and for the first PDCP entity in Step 608. The third SRB configuration may or may not include a PDCP configuration configuring the second PDCP.

In one example, the second SRB configuration and the third SRB configuration include the first SRB identity. Thus, the UE may identify that the second SRB configuration is applied to the first SRB according to the first SRB identity, and may identify that the third SRB configuration is applied to the first SRB according to the first SRB identity.

In one example, the second PDCP is a long-term evolution (LTE) PDCP defined in a first 3GPP technical specification (TS) (e.g., TS 36.323) in a version before, equal to or after v14.4.0, and the first PDCP is a new radio (NR) PDCP defined in a second 3GPP TS (e.g., TS 38.323) in a version equal to or latter than v2.0.0. Variables of the second PDCP may be defined in the 3GPP TS 36.323 v14.4.0 or later version, and are not repeated herein.

In one example, the second SRB configuration is a SRB-ToAddMod defined in a first 3GPP TS (e.g., TS 36.331) before, equal to or after v14.4.0, and the first SRB configuration is a SRB-ToAddMod defined in a second 3GPP TS (e.g., 38.331) equal to or after v1.0.0. The third SRB configuration may be a SRB-ToAddMod defined in a third 3GPP TS (e.g., TS 36.331) before, equal to or after v1.0.0.

The following may be applied to the processes 30-60.

In one example, the first BS, the second BS and the third BS are the same or different BSs. In one example, the first SRB is a SRB1.

In one example, the UE may configure the RLC entity associated to the first SRB according to the first SRB configuration.

In one example, the first RRC connection reconfiguration message may or may not include a full configuration indicator. In one example, the UE receives a RRC connection setup message including the first SRB configuration from the first BS, and transmits a RRC connection setup complete message on the first SRB to the first BS in response to the RRC connection setup message. In one example, the UE receives a second RRC connection reconfiguration message including the first SRB configuration from the first BS or a fourth BS, and transmits a second RRC connection reconfiguration complete message on the first SRB to the first BS in response to the second RRC connection reconfiguration message.

In one example, the UE receives a fourth SRB configuration on the first SRB from the first BS, wherein the fourth SRB configuration configures a second SRB. The UE configures a third PDCP entity associated to the second SRB according to the first PDCP. In one example, the UE releases the third PDCP entity associated to the second SRB and configures a fourth PDCP entity to apply the second PDCP according to a fifth SRB configuration, when the first RRC connection reconfiguration message includes the fifth SRB configuration. In one example, the UE re-establishes the third PDCP entity associated to the second SRB and applies the second PDCP to the third PDCP entity according to the fifth SRB configuration, when the first RRC connection reconfiguration message includes the fifth SRB configuration.

It should be noted that although the above examples are illustrated to clarify the related operations of corresponding processes. The examples can be combined and/or modified arbitrarily according to system requirements and/or design considerations. Message names and IE names described above are examples and should not narrow a scope of the invention.

Those skilled in the art should readily make combinations, modifications and/or alterations on the abovementioned steps, description and examples. Some steps described above may not necessarily have to be used in the invention. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the processes above may be compiled into the program code 214.

The above examples are described from the UE's perspective, and should not restrict the scope of the present invention. The above examples can be amended to arrive at examples for a BS. The 3GPP TSs mentioned above may be considered as part of the present invention.

To sum up, the present invention provides a communication device and a method for handling a SRB configuration. Thus, the communication device knows how to handle the SRB configuration after receiving a RRC message.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a signalling radio bearer (SRB) configuration, comprising:
   at least one storage device; and
   at least one processing circuit, coupled to the at least one storage device, wherein the at least one storage device stores, and the at least one processing circuit is configured to execute instructions of:
   communicating with a first base station (BS) according to a first SRB configuration, wherein the first SRB configuration configures a first SRB;
   configuring a first packet data convergence protocol (PDCP) entity associated to the first SRB according to a first PDCP;
   receiving a first radio resource control (RRC) connection reconfiguration message on the first SRB according to the first PDCP from the first BS or a second BS;
   releasing the first PDCP entity associated to the first SRB and configuring a second PDCP entity to apply a second PDCP according to a second SRB configuration, when the first RRC connection reconfiguration message comprises the second SRB configuration; and
   transmitting a first RRC connection reconfiguration complete message according to the second PDCP entity on the first SRB to a third BS, in response to the first RRC connection reconfiguration message.

2. The communication device of claim 1, wherein the first RRC connection reconfiguration message does not comprise a SRB release indication indicating to release the first SRB, and does not comprise a PDCP release indication indicating to release the first PDCP entity.

3. The communication device of claim 1, wherein the instructions further comprise:
   initializing at least one variable with at least one predetermined value of the second PDCP for the second PDCP entity, when the communication device configures the second PDCP entity; and
   operating the second PDCP according to the second PDCP entity.

4. The communication device of claim 1, wherein the instructions further comprise:
   not releasing the first PDCP entity, when the first RRC connection reconfiguration message comprises a third SRB configuration instead of the second SRB configuration.

5. The communication device of claim 1, wherein the first SRB configuration comprises a first SRB identity identifying the first SRB, and does not comprise a PDCP configuration.

6. The communication device of claim 1, wherein the communication device configures the first PDCP entity associated to the first SRB to apply the first PDCP according to the first SRB configuration.

7. The communication device of claim 1, wherein the first PDCP is a long-term evolution (LTE) PDCP and the second PDCP is a new radio (NR) PDCP, or the first PDCP is the NR PDCP and the second PDCP is the LTE PDCP.

8. A communication device for handling a signalling radio bearer (SRB) configuration, comprising:
   at least one storage device; and
   at least one processing circuit, coupled to the at least one storage device, wherein the at least one storage device stores, and the at least one processing circuit is configured to execute instructions of:
   communicating with a first base station (BS) according to a first SRB configuration, wherein the first SRB configuration configures a first SRB;
   configuring a first packet data convergence protocol (PDCP) entity associated to the first SRB according to a first PDCP;
   receiving a first radio resource control (RRC) connection reconfiguration message on the first SRB according to the first PDCP from a second BS;
   re-establishing the first PDCP entity associated to the first SRB and applying a second PDCP to the first PDCP entity according to a second SRB configuration, when the first RRC connection reconfiguration message comprises the second SRB configuration; and
   transmitting a first RRC connection reconfiguration complete message according to the second PDCP entity on the first SRB to a third BS, in response to the first RRC connection reconfiguration message.

9. The communication device of claim 8, wherein the communication device configures the first PDCP entity associated to the first SRB to apply the first PDCP according to the first SRB configuration.

10. The communication device of claim 8, wherein the first RRC connection reconfiguration message does not comprise a reestablishment indicator indicating the communication device to re-establish the first PDCP entity.

11. The communication device of claim 8, wherein the second SRB configuration includes the reestablishment indicator indicating the communication device to re-establish the first PDCP entity.

12. The communication device of claim 8, wherein the first SRB configuration comprises a first SRB identity identifying the first SRB, and does not comprise a PDCP configuration.

13. The communication device of claim 8, wherein the first PDCP is a long-term evolution (LTE) PDCP and the second PDCP is a new radio (NR) PDCP, or the first PDCP is the NR PDCP and the second PDCP is the LTE PDCP.

* * * * *